United States Patent [19]
Dykhno et al.

[11] Patent Number: 5,700,989
[45] Date of Patent: Dec. 23, 1997

[54] COMBINED LASER AND PLASMA ARC WELDING TORCH

[76] Inventors: Igor S. Dykhno, 400 25th Ave., #3, San Francisco, Calif. 94121; Igor U. Krivtsun, 252049 Suvorova St., Apt. 154; Georgi M. Ignatchenko, 252051 Kiev 51, 44 Tupolev, Apt. 36, both of Kiev, Ukraine

[21] Appl. No.: 366,686

[22] Filed: Dec. 30, 1994

[51] Int. Cl.$^6$ .............................. B23K 26/00; B23K 10/00
[52] U.S. Cl. ................. 219/121.45; 219/121.63; 219/121.84; 219/121.5; 219/121.52
[58] Field of Search ............ 219/121.63, 121.64, 219/121.65, 121.66, 121.72, 121.45, 121.46, 121.44, 121.84, 121.85, 121.59, 121.52, 121.5

[56] References Cited

U.S. PATENT DOCUMENTS

| | | | |
|---|---|---|---|
| 3,872,279 | 3/1975 | Fairbairn | 219/121.65 |
| 3,946,332 | 3/1976 | Samis | 331/94.5 PE |
| 4,167,662 | 9/1979 | Steen | 219/121 L |
| 4,179,599 | 12/1979 | Conrad | 219/121 P |
| 4,377,735 | 3/1983 | Minamida et al. | 219/121 LM |
| 4,390,774 | 6/1983 | Steen et al. | 219/121 FS |
| 4,507,540 | 3/1985 | Hamasaki | 219/121 LD |
| 4,649,256 | 3/1987 | Minamida et al. | 219/121 LD |
| 4,680,770 | 7/1987 | Bell et al. | 372/99 |
| 4,689,466 | 8/1987 | Hoshinouchi et al. | 219/121 L |
| 4,689,467 | 8/1987 | Inoue | 219/121.84 |
| 5,122,632 | 6/1992 | Kinkelin | 219/121.63 |
| 5,131,941 | 7/1992 | Lemelson | 75/10.19 |
| 5,247,155 | 9/1993 | Steen et al. | 219/121.83 |

FOREIGN PATENT DOCUMENTS

| | | | |
|---|---|---|---|
| 0047085 | 3/1984 | Japan | 219/121.84 |
| 0020684 | 1/1990 | Japan | 219/121.84 |

OTHER PUBLICATIONS

*Welding Handbook* (American Welding Society), vol. 2, 8th Edition, "Welding Processes," Chapter 10, entitled 'Plasma Arc Welding,' pp. 330–350.

*Welding Handbook* (American Welding Society), vol. 2, 8th Edition, "Welding Processes," Chapter 16, entitled 'Laser Beam and Water Jet Cutting,' pp. 502–529.

*Welding Handbook* (American Welding Society), vol. 2, 8th Edition, "Welding Processes," Chapter 22, entitled 'Laser Beam Welding,' pp. 714–738.

*Primary Examiner*—Mark H. Paschall
*Attorney, Agent, or Firm*—Mark M. Friedman

[57] ABSTRACT

A welding torch which combines features of both laser and plasma-arc welding torches. A laser beam is directed by an objective lens so that it is co-linear with the central axis of a plasma-arc torch. The laser beam passes through a planar or conical cathode electrode placed at the bottom orifice of the torch. A coaxial hole having a diameter less than that of the laser beam is drilled into the cathode to allow the laser beam to pass through the cathode. A constricting nozzle is placed under the cathode, with the laser beam passing through the axis of the nozzle. As with a standard plasma-arc torch, a gas is forced through a chamber having the cathode and nozzle at its bottom end. As the cathode is heated by the laser radiation, the gas is ionized and a plasma-arc is formed. As the laser beam passes through the nozzle, it comes to a focus and interacts with the plasma-arc formed between the cathode and a workpiece. The resulting interactions between the plasma-arc and laser beam form a plasma-laser discharge which acts to additionally constrict the laser beam and plasma-arc and increase the energy density of the welding spot formed on the workpiece.

8 Claims, 3 Drawing Sheets

COMBINED LASER AND PLASMA ARC WELDING TORCH

FIELD OF THE INVENTION

The present invention relates to the design of torches used in welding processes, and more specifically, to a design for a welding torch which combines elements of laser and plasma-arc welding technologies to produce a device having a much higher coupling efficiency of the energy produced by the welding tool to the workpiece than is achievable by standard plasma and laser welding torches.

BACKGROUND OF THE INVENTION

Welding is a vital manufacturing technology in many industries. Welding processes are energy intensive as they require the production of high energy densities in order to create and move a pool of liquid material. In most common welding methods, the energy coupling efficiency between the welding tool and a workpiece is twenty to thirty per cent at best, depending upon the material and welding technology used. Thus, significant economic benefits can be obtained if the coupling efficiency can be increased. Other aspects of the welding process, such as weld quality and productivity are also of interest and can impact the economics of the welding process. Because all of these factors are in some way dependent upon the energy density which is incident on the workpiece, much effort has been made to increase this quantity by developing additional technologies and welding tools.

One of these technologies, plasma welding is a process in which a constricted arc is used as an energy source to melt and then fuse two metal pieces together. Plasma welding is routinely used in heavy industry because it can be used to weld thick plates quickly with a single pass, while producing a high quality weld. This technology is based on producing a high temperature partially ionized gas stream by forcing an inert gas through an electric arc. The arc heats the gas to a temperature where it becomes ionized and conducts electricity.

If an electric field is set up between an electrode and the workpiece, the plasma-arc formed by the ionized gas will impinge on the workpiece and melt the material. In plasma-arc welding, appropriate choices of plasma gas flow rate, arc current, and weld travel speed will create conditions in which the high energy and momentum of the plasma-arc produces a dynamic pressure which causes the arc to penetrate the molten pool of material, forming a small hole which penetrates completely through the base metal. The hole is termed a "keyhole" and the welding technique in which such a feature is formed is termed "keyhole welding". In the keyhole technique, molten metal is displaced to the top surface of the bead of material by the plasma stream as the stream penetrates the material and forms the keyhole. As the plasma-arc torch is moved along a weld joint, metal melted at the front of the keyhole flows around the plasma-arc to the rear to form a weld pool. The principal advantage of this form of welding is the ability to perform relatively fast welding of materials with a single pass, with minimal preparation of joints. In addition, a general benefit of plasma welding is that it reduces stress or deformation in the workpiece because the plasma-arc is concentrated inside the keyhole.

FIG. 1 shows the components of a typical prior art plasma-arc welding torch 10. Torch 10 is composed of an electrode 12 which is recessed inside of and surrounded by a constricting nozzle 14 having an exit orifice 15. The space formed in-between electrode 12 and nozzle 14 is referred to as the plenum chamber 16. Nozzle 14 is partially surrounded by an outer or shielding gas nozzle 17.

In the operation of torch 10, an electric current is set up between electrode 12 and a workpiece 18 or between electrode 12 and nozzle 14. An orifice gas is forced into plenum chamber 16, thereby surrounding electrode 12. The orifice gas becomes ionized in the electric arc, thereby forming a plasma. The plasma issues from orifice 15 as a plasma-jet 20 and impinges on workpiece 18. Because electrode 12 is recessed inside plenum chamber 16, plasma-jet 20 is collimated and focused by the constricting nozzle (and the electric field set up between the electrode and workpiece if such is the case) onto a small region of the workpiece. This serves to increase the energy density on the workpiece. An auxiliary shielding gas is commonly forced through outer nozzle 17 and is used to blanket the region on workpiece 18 at which the plasma-jet impinges in order to reduce atmospheric contamination of the melted material pool formed by the jet.

Even though plasma-arc welding has many important advantages as a welding method, there are several serious limitations to plasma welding technology. The depth of keyhole penetration and therefore weldable material thickness, as well as the achievable welding speed, are limited by the energy density of the plasma-arc. In addition, the keyhole may collapse under some operating conditions, thereby creating an obstacle to finishing the weld joint. Another limitation is that plasma instabilities and plasma width restrict the use of the technique to certain types of materials.

In plasma welding, the energy density at the location of the workpiece is the most important parameter in establishing the keyhole. The keyhole forms under a range of welding currents from 10 to 250 amps, depending on the material and velocity of the workpiece with respect to the welding torch. In addition, the available energy density in the plasma-arc and therefore into the heated spot on the workpiece depends on the mechanisms of heat transfer within the plasma-arc.

In this regard, there are three modes of heat transfer loss from the plasma-arc to the environment; convection, conduction, and radiation. These modes of heat transfer reduce the temperature of the plasma-arc, and consequently the energy density at the workpiece. The conduction mechanism is usually negligible under most operating conditions. When the plasma-arc operates at relatively low temperature, convective heat losses to the environment are dominant. However, as the temperature of the arc increases, radiative heat losses, which are proportional to the fourth power of temperature, become dominant. An equilibrium condition exists in which any increase in plasma-arc energy due to dissipative electrical current flow and temperature is offset by the radiative losses. This condition limits the maximum power density of the plasma welding process, thereby limiting the ability to weld thicker plates or increase the welding speed, and therefore the productivity of this welding process.

During normal plasma-arc welding, radiative heat transfer becomes dominant for currents of about 200–250 amps, and plasma power densities of about 3–3.5 kW. It is physically impossible with existing technologies to achieve higher power densities with plasma welding. Any attempt to increase power density by increasing power consumption from the welding torch leads to a reduction in welding efficiency. If higher speed welding is attempted, the plasma-arc becomes unstable and poor quality welding results.

High-speed plasma welding is difficult to achieve because the heating spot on the workpiece quickly falls behind the welding torch axis. Such spatial instability is a reason for poor weld quality.

Another type of welding process which can achieve high energy densities at a weld point on a workpiece is laser beam welding. This welding process also relies on forming a keyhole in the material to be welded and has found many applications in industry. In terms of the power density on the workpiece, laser beam welding (LBW) can be compared with electron beam welding (EBW). The advantage of LBW is that it can be performed in the ambient air as well as in different atmospheric conditions, while EBW requires a vacuum. The atmosphere through which the laser beam is propagating can be adjusted to optimize the energy transfer to the workpiece and hence to optimize the welding process. Laser beam welding in the keyhole mode provides a relatively large penetration depth, which allows welding of thicker materials at a relatively high velocity compared to other more conventional welding technologies. Laser beam welding is also very precise, provides low thermal distortion in the workpiece, and minimizes the need for filler material, thereby providing a cost savings and making this technique more economically feasible.

However, laser beam welding also has several important limitations. It typically requires large, high powered $CO_2$ or Nd:YAG lasers to generate and sustain the keyhole. The penetration depth and thickness of weldable material are governed by the power of the laser beam and the amount coupled to the workpiece. This suggests that improved performance could be obtained by increasing the laser power. This approach is of limited value due to the formation of a laser induced plasma, because such a plasma can reflect the laser beam energy, thereby reducing the amount of energy deposited on the workpiece.

The transmission of the laser beam to the workpiece is also affected by the composition and propagation properties of this plasma. It is known that a metal plasma is essential for maintaining the keyhole during the welding process due to the pressure it generates on the keyhole walls. However, it is detrimental if the plasma's elemental composition or electron density becomes so high as to cause reflection of the laser beam. If its density becomes either too low or too high, the efficiency of the welding process decreases, or may cease altogether.

In addition to energy losses from the plasma, laser beam welding is difficult to initiate on materials such as metals because the high surface reflectivity causes the impinging laser beam to reflect instead of being delivered to the surface. This normally necessitates much higher laser powers to establish a keyhole. Once welding is initiated and the keyhole is formed, the metal body acts as a blackbody for laser radiative heating, and the laser energy can be reduced to continue the weld. Improving the amount of laser beam power deposited onto the workpiece, by reducing the amount of reflected energy from the surface and from the ionized vapor plasma, can substantially increase the welding efficiency and reduce the power requirements of the laser. Another important limitation is that lasers are inherently very inefficient in terms of the conversion of input power to output power of the laser beam.

During laser beam welding there are several mechanisms by which heat is transferred into the workpiece. The relative significance of each of these mechanisms depends on the energy and power density of the laser beam. Qualitatively, when the laser power is less then 1-2 kilowatts (KW), the laser beam energy is optically absorbed and melts the material at the incident spot. In this situation, heat transfer between the laser beam and the material is governed by the thermal characteristics of the material. The surface reflectivity of the material can severely reduce the fraction of the laser energy delivered to the surface. The effective coupling of the laser energy to the workpiece in this case is on the order of 5-10%.

When the laser beam power is greater than approximately 1-2 KW, the material surface reaches its vapor temperature and a metal-vapor plume forms. The exact transition power from the surface heating mode to the keyhole mode occurs at an energy level that depends on the power of laser beam, the welding velocity, and the thermal characteristics of the material. The plume recoil pressure causes penetration of the laser beam energy through the molten metal to form a keyhole. The laser beam now passes into the keyhole and delivers energy to the workpiece by radiative heat transfer. In this case, the laser beam absorption into the welding pool is much higher than when the laser beam interacts with the reflective surface because the keyhole acts as a black body (higher by 70% in some ideal cases). However, in this mode, as the material vaporizes and the plasma link is established, the plasma may become too hot and shield the laser energy from the surface. Although laser beam welding is normally done in the keyhole mode, instabilities, especially when operating near the threshold energy level, or when the welding velocity is too great, can cause a collapse of the keyhole leading to significant production problems.

An apparatus for reducing the amount of laser light reflected from a metal workpiece is described in U.S. Pat. No. 4,689,466, issued Aug. 25, 1987, and entitled "Laser-beam Operated Machining Apparatus". This patent describes a welding device in which a laser beam is forced through an unconstricted nozzle and allowed to impinge on a workpiece. An annular electrode is placed on the end of the nozzle to permit the formation of an electric arc discharge between the electrode and the surface of the workpiece. An assist gas is forced through the nozzle and is transformed into a plasma as it is ionized by the electric arc. The plasma absorbs some portion of the reflected laser light, and transfers some of the absorbed energy to the surface of the workpiece. In this manner, some of the energy normally lost due to reflection is captured and applied to the process of forming the weld, thereby increasing the efficiency of the process. Thus, in this welding apparatus, the coupling efficiency of the energy produced by the laser torch is increased by forming a surrounding plasma which retains some of the reflected energy which would normally be lost.

The aforementioned patent describes an apparatus in which a laser beam interacts with an unconstricted arc, therefore, the temperature of the plasma is lower than that of the plasma arc. As a result, the absorption coefficient describing the absorption of the laser beam into the unconstricted arc is relatively low. Therefore, significant absorption of laser energy into the arc will generally occur only when high powered lasers (such as $CO_2$ lasers) are used. This can be a disadvantage in situations where such lasers are too costly to use for a specific application.

In addition, as mentioned previously, the surface of the material to be welded may reach its vapor temperature, producing a metal-vapor plume. This plume can act to shield the laser beam from the surface of the material, leading to difficulties in carrying out the welding process. Furthermore, the electric-arc dynamic pressure may not be sufficient to initiate the keyhole mode of operation, especially when lower powered $CO_2$ or Nd-YAG lasers are used.

Several groups of researchers have investigated the possibility of increasing laser welding efficiency by augmenting an electric-arc welding device with a laser beam. In a recent approach, the anode of an arc welding head was coupled with a laser, so that both sources of heat interacted with the material, thereby acting as one combined source. The arc passed under the laser beam at an angle and was placed a little forward of the beam. The combined welding capability was higher than if the energy of the laser beam had been added to the energy of the arc. This arrangement reduced the total energy consumption by approximately 5% while obtaining the same results as would occur if only a laser welding tool was used. It is believed that the explanation for the improved efficiency is that the heating of the workpiece caused an increase in the absorption coefficient of the material.

What is desired is a welding torch which is capable of producing high energy densities at the location of a workpiece while coupling a greater percentage of the energy produced by the torch to the workpiece than is presently achievable by plasma-arc or laser welding torches.

SUMMARY OF THE INVENTION

The present invention is directed to a welding torch which combines features of both laser and plasma-arc welding torches. A laser beam is directed by an optical system typically composed of an objective lens so that it is co-linear with the central axis of a plasma-arc torch. The laser beam passes through a planar or conical cathode electrode placed at the bottom orifice of the torch. The cathode is water cooled to provide better control of the plasma-jet which will be formed. A coaxial hole having a diameter less than that of the laser beam is drilled into the cathode to allow the laser beam to pass through the cathode.

A constricting nozzle is placed under the cathode, with the laser beam passing through the axis of the nozzle. As with a standard plasma-arc torch, a gas is forced through a chamber having the cathode and nozzle at its bottom end. As the cathode is heated by the laser radiation, it permits the plasma-arc to be initiated at a lower voltage than is usually required. As the laser beam passes through the nozzle, it comes to a focus and interacts with the plasma-arc formed between the cathode and a workpiece. The resulting interactions between the plasma-arc and laser beam form a plasma-laser discharge which focuses the laser beam and increases the energy density of the welding spot formed on the workpiece. The welding torch of the present invention can also be operated in the reverse polarity mode. For this purpose, the water cooled electrode has an inside diameter slightly greater than that of the laser beam. A $CO_2$ laser or a Nd:YAG laser may be used as the source of the laser beam, with the increased efficiency of the system allowing lower power lasers to be used to perform welding operations in the keyhole mode.

Further objects and advantages of the present invention will become apparent from the following detailed description and accompanying drawings.

DETAILED DESCRIPTION OF THE PREFERRED EMBODIMENT

Figure 1:
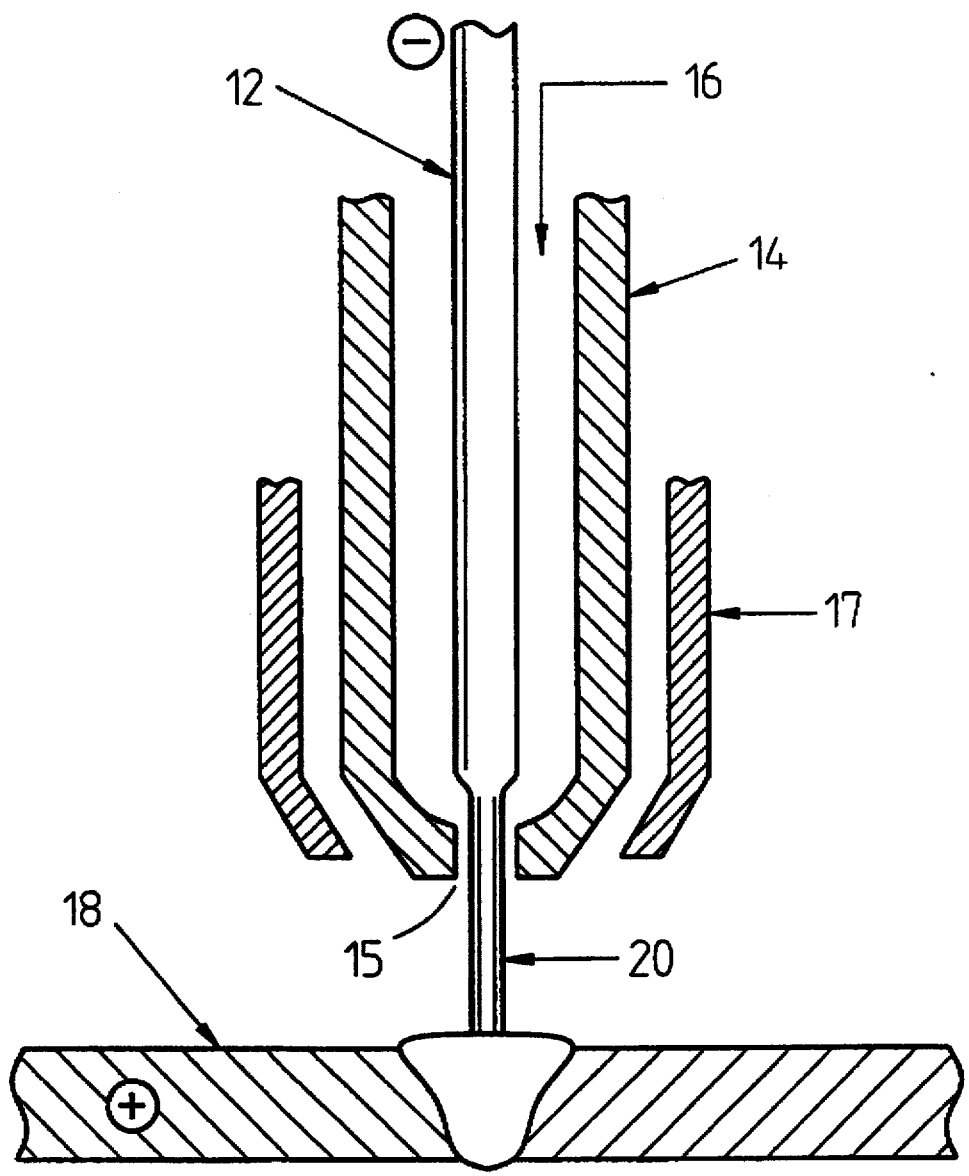
FIG. 1 shows the components of a typical prior art plasma-arc welding torch.
Figure 2:
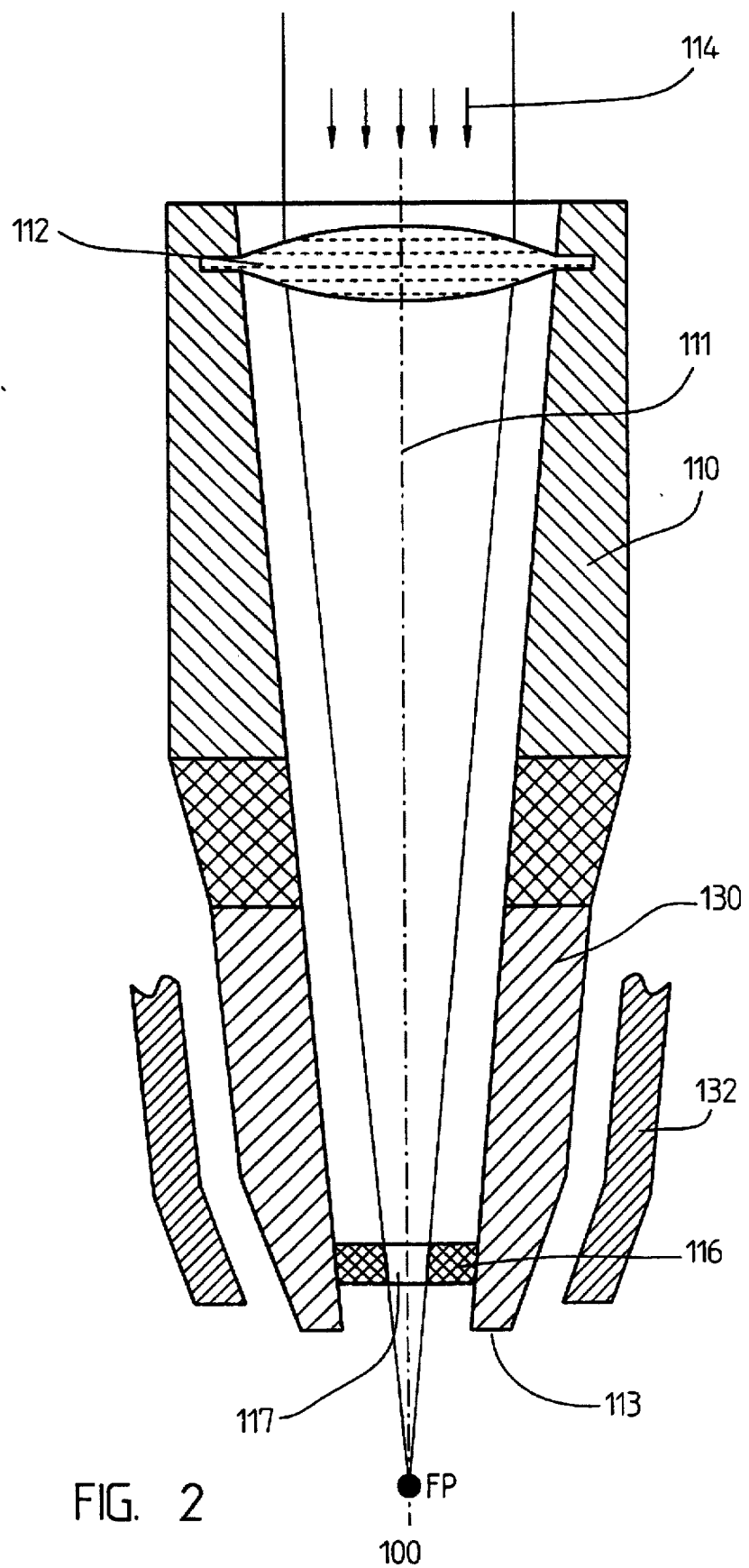
FIG. 2 is a cross-section view of the welding torch of the present invention.
Figure 3:
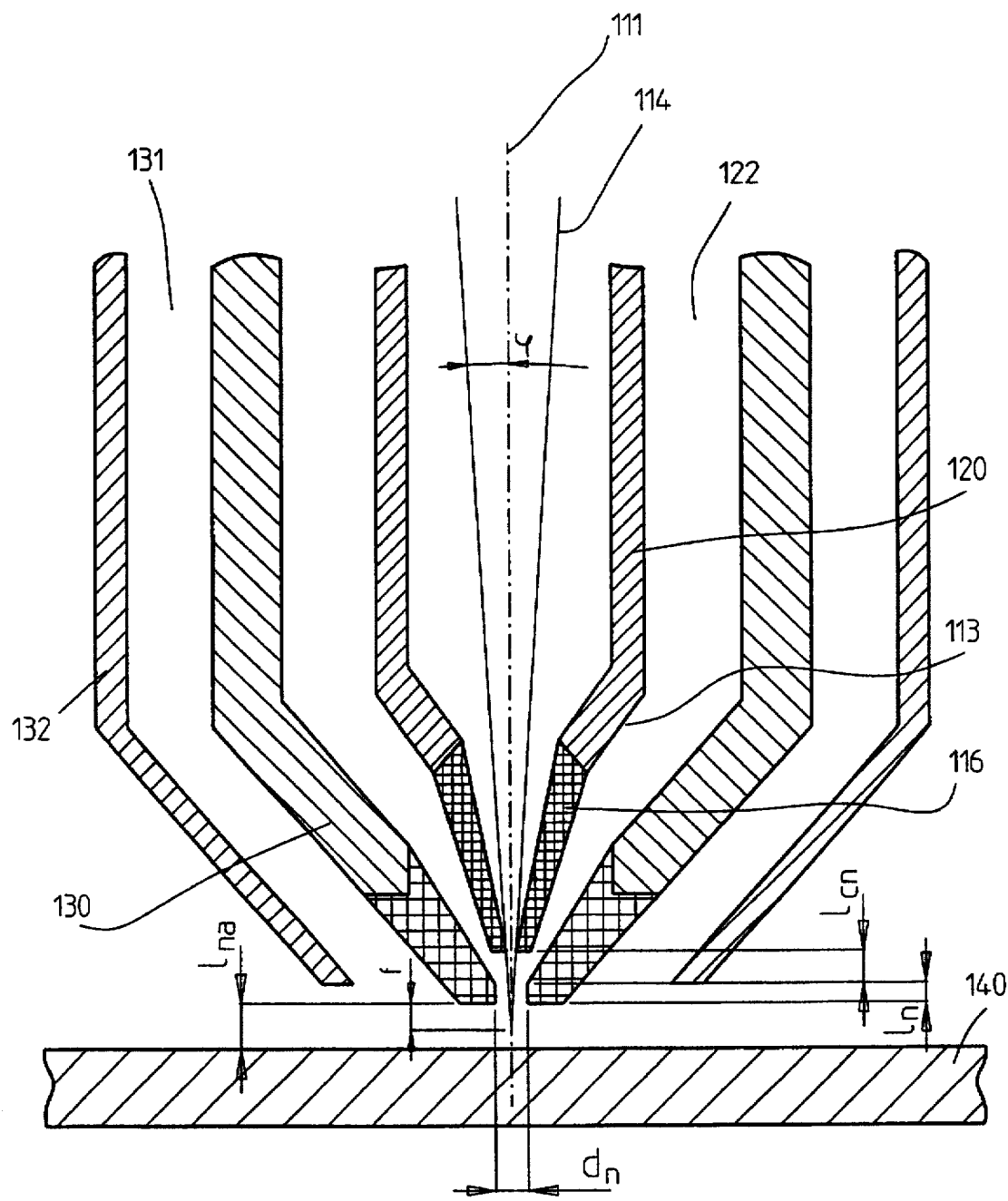
FIG. 3 is a partial cross-section view of the lower portion of the welding torch of the present invention.

FIGS. 2 and 3 show cross-sectional views of the welding torch 100 of the present invention. Torch 100 includes a main torch body 110 at one end of which is placed an optical system, typically consisting of an objective lens 112. Lens 112 serves to focus incoming laser beam 114 so that the beam is co-linear with the central axis 111 of torch body 110 and comes to a focus a focal point FP which is located external to torch 100.

Conical cathode 116 is placed at the opposite end of torch body 110 from the location of lens 112. Cathode 116 may also be of a planar design. A hole 117, which is co-axial with central axis 111, is drilled through cathode 116 so that laser beam 114 can exit torch 100. The diameter of hole 117 is less than the diameter of laser beam 114 at the location of cathode 116. Thus, in the operation of torch 100, laser beam 114 will act to heat the inside surface of cathode 116. In the preferred embodiment, the inside diameter of hole 117 is approximately 5 to 15% smaller than the diameter of laser beam 114 at that location.

Main body 110 of torch 100 is surrounded by cooling nozzle 120. Water or another cooling medium is pumped through cooling nozzle 120 by means of suitably oriented outlets. As shown in FIG. 3, which is a partial cross-section view of the lower portion of welding torch 100 of the present invention, constricting nozzle 130 surrounds cooling nozzle 120, with the space 122 between the two being used for the purpose of injecting the orifice or plasma gas. Note that elements shown in FIG. 3 having the same identifying numbers as in FIG. 2 correspond to the same elements as in that figure.

When a current is established between cathode 116 and a workpiece 140, or between cathode 116 and an outer or shielding nozzle, the plasma gas will become ionized and form a plasma. Outer or shielding nozzle 132 surrounds constricting nozzle 130, with the space 131 between the two being used to inject a shielding gas. Suitably oriented outlets may be used for purposes of injecting the shielding gas.

Several important parameters of torch 100 of the present invention are also identified in FIG. 3. The diameter of the channel or orifice formed by constricting nozzle 130 at the outlet of torch 100 is identified by $d_n$. The torch standoff, which is the distance between the bottom of constricting nozzle 130 and workpiece 140, is identified as $l_{na}$. The distance between the bottom of constricting nozzle 130 and the focal point of laser beam 114 is identified as f. The length of the exit throat or channel of constricting nozzle 130 is identified as $l_n$, while the setback distance of the end of cathode 116 from the inner surface of constricting nozzle 130 is identified as $l_{cn}$. The significance of these parameters will become clearer as the operation of the welding torch of the present invention is discussed in greater detail.

In the operation of the plasmotron welding torch 100 of the present invention, a current is established between cathode 116 and an anode, typically workpiece 140. Laser beam 114, supplied by an external laser source (not shown) is passed through objective lens 112 causing the beam to propagate co-linearly with central axis 111 of main body 110. Because exit hole 117 in cathode 116 is smaller in diameter than the width of laser beam 114 at that location, some portion of beam 114 impinges on the inner surface of cathode 116.

This acts to heat cathode 116, increasing its emission of electrons. Thus, both the electric current and the heating of cathode 116 by laser beam 114 serve to produce electrons.

As the orifice or plasma gas is pumped through chamber 122 formed between cooling nozzle 120 and constricting nozzle 130, the gas becomes ionized and a plasma-arc is formed.

Laser beam 114 interacts with the plasma-arc along its axial direction, forming a combined laser-plasma discharge, which then interacts with workpiece 140. When laser beam 114 passes through the plasma-arc, optical absorption of some portion of the laser beam occurs, influencing the energy distribution of both the laser beam and the plasma-arc. In order for the plasma to absorb a significant amount of the laser beam energy, it is desireable that $K(\lambda) \bullet L \approx 1$, where $K(\lambda)$ is the absorption coefficient of the plasma gas at the wavelength $\lambda$ of the laser beam, and L is the length of the propagation path of the laser in the plasma.

As the laser beam interacts with and is absorbed by the plasma, the plasma temperature and current density along the laser beam axis are increased. The stability of the plasma-arc is increased, partially as a result of the coupling of the electric and magnetic fields associated with the increased current density within the plasma. Additional focusing of the laser beam results from the lensing effect of the plasma fields. A decrease in the operating voltage of the plasma-arc may be realized due to the modified electric field.

In addition to these features of the direct interaction between the laser and plasma, there are indirect interactions between the laser beam and the anode or workpiece which act to further increase the energy density at the surface of the workpiece. As the laser beam impinges on the workpiece, ablation of the workpiece occurs. As the surface of the workpiece vaporizes, it forms a surface plasma jet. The ionization potential of the surface jet is lower than that of the commonly used orifice and shielding gases. As a result, the degree of ionization of the surface plasma and the electroconductivity of the plasma at the location above the laser spot on the workpiece will increase. Owing to this increase, current from the electric arc will flow into this region. This acts to further constrict the plasma-arc and increase the energy density at the location where the arc impinges on the workpiece.

The main physical effects expected to take place in this augmented interaction between a laser beam and a plasma are: constriction of the plasma-arc to produce an increased energy density, reduced heat-effected zone on the workpiece, increased plasma temperature, increased plasma-arc stability, and a reduced energy consumption. The net effect will be to produce a higher energy density spot on the workpiece and to more efficiently couple the energy of the laser and electric arc to the workpiece.

The laser beam can be more efficiently coupled to the workpiece due to several factors. The formation of a keyhole by the plasma-arc or jet can act as a black surface for the laser beam, thereby increasing the absorption of the laser beam energy into the workpiece. A greater percentage of the laser beam energy can be deposited on the workpiece because the laser energy is not needed to form the keyhole. Finally, more efficient coupling occurs because the induced metal or surface plasma is not needed to maintain the keyhole as in normal laser welding processes (augmented plasma coupling).

Similarly, the plasma-arc or jet can more efficiently couple to the workpiece because of the laser induced ionization along the plasma-arc axis. The plasma-arc or plasma-jet can be heated by the laser beam and thus should be able to operate at a lower voltage/current than would otherwise be necessary. The laser generated ionized channel will provide a high electron density region offering lower electrical resistance to the plasma-arc. The combined interaction will also have the additional effect of constricting and stabilizing the plasma-arc, where a relatively small increase in the electron density should be sufficient to achieve these effects.

Preliminary research by the inventors of the present invention indicates that an unstable arc can be stabilized and that a stable arc can have its resistance reduced due to the interaction/coupling of the laser and plasma. When a plasma arc was added to the interaction between a laser beam and a material surface, it produced an effect similar to that of a more powerful laser. The plasma-arc undergoes a constriction in width to nearly the same size as the laser beam, indicating the importance of the laser's electric field to the plasma's fluid dynamics.

An important aspect of the present invention is the identification of those parameters of the welding torch which influence constriction of the plasma-arc, and determining their optimal values so as to maximize the energy density delivered to the workpiece. The inventors have found that the performance of the welding torch of the present invention is improved when the diameter of the constricting nozzle, $d_n$, has a value between 1.5 mm and 4.0 mm, the length of the exit throat of the constricting nozzle, $l_n$, has a value between $0.5\ d_n$ and $2\ d_n$, the length of the exit throat, $l_n$, and the cathode setback distance, $l_{cn}$, are related by $l_{cn}+l_n=l_n+(0.5,\ldots,1.5)$ mm (i.e., $l_{cn}$ takes on a value between 0.5 and 1.5 mm), the torch standoff distance, $l_{na}$, and the distance between the focal point of the laser beam, f, and the bottom of the constricting nozzle are related by $f=l_{na}-2$ mm, and the focus angle of the laser beam, $t_g$, is given by $0.05 \leq t_g = 0.1$.

The inventors have also determined that the present invention may be used to performing welding operations in the keyhole mode using $CO_2$ lasers at a laser power of between 800 watts and 5 kilo-watts, or Nd:YAG lasers at a laser power of between 400 watts and 2.5 kilo-watts. These values of the useable laser power are important because at present, the laser power needed to operate a laser welding torch in the keyhole mode is far greater. Thus, in addition to its other benefits, the present invention provides a more economically efficient means of performing welding operations because lower power and less expensive lasers sources may be used.

An important difference between the present invention and prior art laser welding or augmented laser welding techniques concerns the optimal focal point of the laser beam. In laser beam only welding, the optimum focal point is at or just below the workpiece surface to allow maximum heating of the workpiece and penetration by the laser beam. However, in the case of the present invention it is preferable that the focal point of the laser beam be in front of the workpiece. This is to permit the optimal coupling of the laser beam to the plasma-arc prior to the arc impinging on the workpiece.

Under such coupling conditions, the amount of energy delivered by the laser beam to the plasma is on the order of that delivered by the electric current. In this situation the temperature, current density, velocity, and gas dynamic pressure of the combined laser-plasma discharge differ significantly from the corresponding characteristics of a common plasma-arc discharge.

For example, the plasma temperature, velocity, and gas dynamic pressure of the combined discharge are expected to be almost twice their respective values for a plasma-arc discharge. These features of the combined discharge permit the coupling of the discharge to the surface of the workpiece without encountering the problems associated with the creation of a surface plasma during the formation of the combined discharge. This goal is realized and the optimal coupling of the laser beam to the plasma-arc is obtained by bringing the laser beam to a focus in front of the workpiece.

The inventors have also investigated the physics and heat transfer properties of the coupling of laser energy to a plasma-arc or jet, as a function of plasma conditions, including temperature and electron density of the plasma. Research tasks have included characterization of the plasma-arc by measuring temperature and electron density gradients spatially using an optical pyrometer and a laser probe-beam deflection technique. Research has been directed towards increasing the energy density at the surface of a workpiece for a given laser by determining the optimum plasma-arc conditions, leading to the use of a lower power and more energy efficient laser.

The inventors have determined that to achieve a better coupling of the laser-plasma discharge to a workpiece for either a $CO_2$ or Nd:YAG laser, it is desireable that the plasma-arc power be between 1.5 and 2 times the value of the laser power. Under the conditions described in this application, it is possible to conduct welding operations with a $CO_2$ or Nd:YAG laser having approximately one-half the power required to perform the same operation when a laser is used alone as a welding device.

The inventors have investigated the following characteristics of a welding operation which is conducted using the present invention:

1. The intensity and optical absorption coefficient of the laser beam in the plasma-arc as a function of laser power, electric current, voltage, mixture and flow of the orifice and shield gases;
2. The deviation in the focus of the laser beam, the power and maximum intensity of the laser beam radiation at the focus as a function of the electric-arc current and laser power; and
3. The plasma-arc temperature on the discharge axis as a function of the laser power.

The results of these investigations have indicated that the effect of increasing the laser power on the characteristics of the plasma-arc are primarily due to changes in the absorption coefficient of the plasma. Furthermore, although an increase in the laser power generally results in an increase in the temperature of the plasma, there is a threshold level beyond which further increases in laser power results in a reduction in the intensity of the combined discharge, and hence in the power density at the surface of the workpiece.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A plasmotron torch for applications such as welding combining laser and plasma-arc technologies, and capable of efficiently producing high energy densities at the surface of a workpiece, comprising:

a source of an input laser beam;

a main body having an input end, an output end, and a central axis of revolution;

an optical system disposed at the input end of the main body to direct the input laser beam co-linearly with the central axis, the laser beam being focused at a point outside of the main body and in front of the workpiece;

a cathode placed at the output end of the main body and having a hole in its center through which the laser beam can pass after the beam is directed by the optical system;

a constricting nozzle placed over the cathode;

means for providing a plasma gas into a region between the cathode and constricting nozzle; and means for forming an electric arc between the cathode and the workpiece, thereby causing the plasma gas to form a plasma which issues from the constricting nozzle as a plasma-jet and interacts with the focused laser beam to form a combined plasma laser discharge.

2. The welding torch of claim 1, wherein the source of the laser beam is a Nd:YAG laser.

3. The welding torch of claim 2, wherein the power of the laser is between 400 watts and 2.5 kilo-watts.

4. The welding torch of claim 1, wherein the optical system is an objective lens.

5. The welding torch of claim 1, wherein the cathode has a conical shape.

6. The welding torch of claim 1, wherein the source of the laser beam is a $CO_2$ laser.

7. The welding torch of claim 6, wherein the power of the laser is between 800 watts and 5.0 kilo-watts.

8. The welding torch of claim 1, wherein the diameter of the constricting nozzle, $d_n$, has a value between 1.5 mm and 4.0 mm, a length of the exit throat of the constricting nozzle, $l_n$, has a value between 0.5 $d_n$ and 2 $d_n$, the length of the exit throat, $l_n$, and a cathode setback distance, $l_{cn}$, are related by $l_{cn}+l_n=l_n+(0.5,\ldots,1.5)$ mm, and the torch standoff distance, $l_{na}$, and the distance between the focal point of the laser beam, f, and the bottom of the constricting nozzle are related by $f=l_{na}-2$ mm.

* * * * *